(12) United States Patent
Lefevre

(10) Patent No.: US 6,913,631 B2
(45) Date of Patent: Jul. 5, 2005

(54) SOLID COMBUSTIBLE ELEMENT FOR DISINTEGRATING A COMBUSTION DEPOSIT LAYER AND METHOD FOR PRODUCING SUCH AN ELEMENT

(75) Inventor: Christophe Lefevre, Beveren-Leie (BE)

(73) Assignee: NV Behoko, Waregem (BE)

( * ) Notice: Subject to any disclaimer, the term of this patent is extended or adjusted under 35 U.S.C. 154(b) by 299 days.

(21) Appl. No.: 09/836,158

(22) Filed: Apr. 17, 2001

(65) Prior Publication Data

US 2001/0029697 A1 Oct. 18, 2001

(30) Foreign Application Priority Data

Apr. 17, 2000 (BE) .......................................... 2000/0279

(51) Int. Cl.$^7$ .............................................. C10L 10/00
(52) U.S. Cl. ............................. 44/640; 44/603; 44/589; 44/590; 44/522
(58) Field of Search ........................ 44/522, 603, 589, 44/590, 640

(56) References Cited

U.S. PATENT DOCUMENTS

| | | | | |
|---|---|---|---|---|
| 936,241 | A | * 10/1909 | Ellis ............................ | 44/602 |
| 3,252,770 | A | 5/1966 | Fearon ........................... | 44/40 |
| 3,515,525 | A | 6/1970 | Fearon ........................... | 44/40 |
| 4,147,518 | A | 4/1979 | DeHart et al. ................. | 44/13 |
| 4,670,018 | A | * 6/1987 | Cornwell ....................... | 44/522 |
| 5,882,365 | A | * 3/1999 | Farjon et al. .................. | 44/535 |

FOREIGN PATENT DOCUMENTS

| | | |
|---|---|---|
| DE | 1 58 469 | 7/1903 |
| DE | 29 508 692 | 9/1995 |
| EP | 0 010 792 | 5/1980 |
| FR | 1 390 668 | 6/1965 |
| FR | 2 554 458 | 5/1985 |
| FR | 2 564 851 | 11/1985 |
| FR | 2 601 381 | 1/1988 |
| FR | 2 667 611 | 4/1992 |
| FR | 2 749 855 | 12/1997 |
| GB | 1 281 064 | 7/1972 |

OTHER PUBLICATIONS

Abstract of FR 2 749 855 (published Dec. 19, 1997).
Abstract of FR 2 667 611 (published Apr. 10, 1992).
Abstract of FR 2 564 851 (published Nov. 29, 1985).
Abstract of FR 2 554 458 (published May 10, 1985).
Abstract of EP 0 010 792 (published May 14, 1980).
Abstract of DE 1 58 469 (published Jul. 23, 1903).

* cited by examiner

Primary Examiner—Cephia D. Toomer
(74) Attorney, Agent, or Firm—Maria Parrish Tungol

(57) ABSTRACT

This invention relates to a solid combustible element and a method for manufacturing it, whereby in the element an open or closed internal space is provided, and in this space is placed a chemical product for disintegrating a combustion deposit layer. When burning this element in a combustion device, such as e.g. a hearth or a stove, the product is released so that a combustion deposit layer (e.g. consisting of soot, ash and tar) formed on the walls of the combustion device or the smoke flue is disintegrated. The element is preferably formed by compressing an amount of loose particles of one or several solid combustible materials, such as among others wood waste and sawdust, without adding any binding agent.

Figure 1:
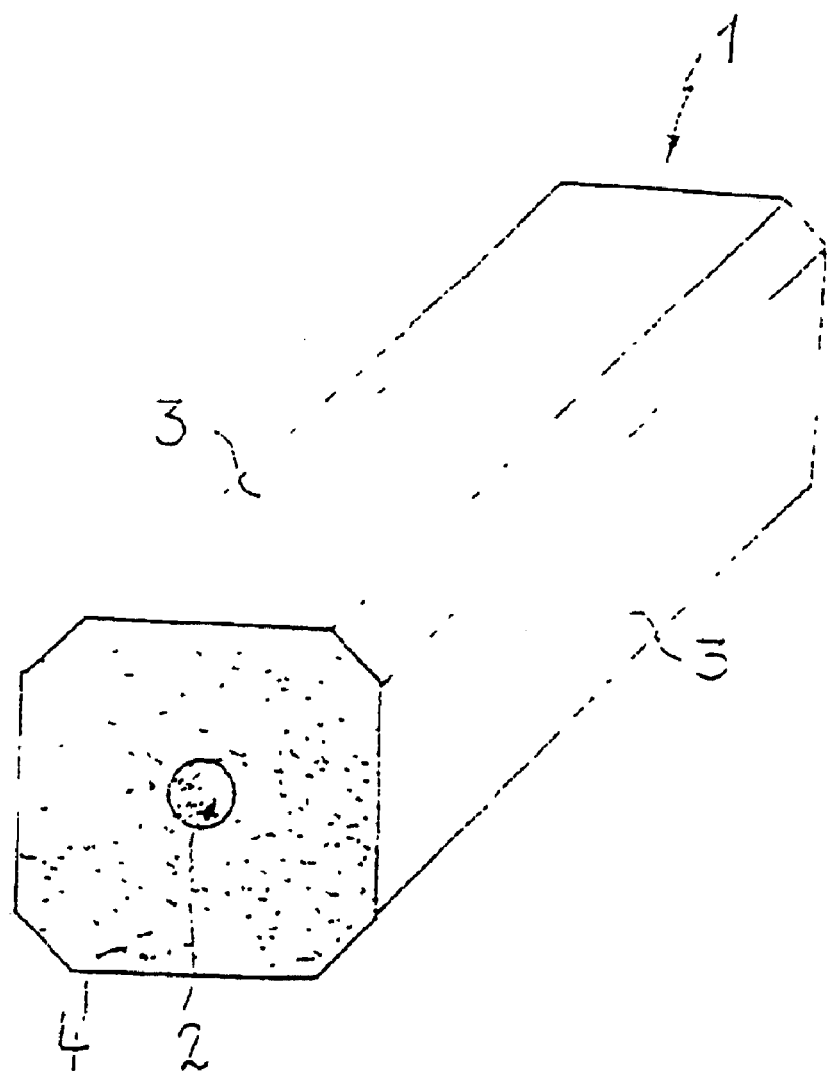

Such an element can be manufactured at lower raw material and production costs than the known elements in which such a product is incorporated.

13 Claims, 1 Drawing Sheet

SOLID COMBUSTIBLE ELEMENT FOR DISINTEGRATING A COMBUSTION DEPOSIT LAYER AND METHOD FOR PRODUCING SUCH AN ELEMENT

This invention relates to a method for manufacturing a solid combustible element, comprising a product for disintegrating a combustion deposit layer, such as for example soot and/or tar deposits that are the result of a combustion. This invention furthermore also relates to such a solid combustible element and in particular such a combustible element that is formed out of loose particles of a combustible material, such as for example wood waste and/or sawdust.

With each device that comes into contact with fire and/or smoke, such as for example a heating apparatus (a hearth, a stove, . . . ), an incinerator and the smoke flues (e.g. chimneys) thereof, the problem exists that after the course of time a deposit layer is formed on the walls that come into contact with the fire or the smoke. This deposit layer, referred to in this patent application by the term combustion deposit layer, gradually becomes thicker. The composition of this combustion deposit layer is dependent on the type of fuel. As a result of the combustion of solid fuels, such as coal or wood, this layer will principally consist of a combination of soot particles, ash, and tar.

This combustion deposit layer comprises combustible components and can in the course of use of the apparatus or the installation spontaneously start to burn. This fire can be dangerous and cause damage. So-called chimney fires arise through an ignition of the combustion deposit layer deposited on the chimney walls.

On the walls of smoke flues, such as among others chimneys, this layer furthermore also leads to a decrease in the passage section of the duct, with the result that the smoke discharge progresses less efficiently.

In order to avoid these disadvantages the installation, and certainly the smoke flue thereof must be regularly cleaned. Moreover it is the intention to remove at least partially the aforesaid combustion deposit layer. This cleaning can be performed by removing the layer manually with a hard brush or mechanically with another tool. This method is applied by the generally known chimney sweeping. This is however a rather laborious and time-consuming work for which a certain expertise is required. Furthermore the deposit layer is not always successfully reduced to a sufficient degree so that even after the cleaning a certain risk of ignition and a reduced smoke passage section remains.

Chemical products also exist for achieving the cleaning referred to above. A known product is marketed by the German firm "Boomex". The product is composed of (the given percentages are weight percentages) 2 to 4% cupric chloride, approximately 15% ethylene glycol and approximately 70% polyethylene glycol, and is sold in liquid form. Another known product is sold in powder form and contains ammonium chloride (<90%), copper sulfate (<10%) and zinc chloride (<10%). This product is also available in tablet form and then consists of among others copper(II) chloride, ammonium chloride and zinc stearate.

These types of products have to be inserted in the fire place during use of the installation or the apparatus in order to allow the active components thereof to come into contact with the combustion deposit layer. This way these active components also arrive with the flue gases in the smoke flue where they come into contact with the combustion deposit layer on the walls of this duct. These chemical products are capable of disintegrating this deposit layer, and in particular the soot and/or tar deposits, or weakening the cohesion thereof at least such that they can be removed more easily and more fully than formerly in mechanical manner or come loose from the wall by themselves.

A disadvantage of the prescribed method of use of these products consists in that this use is rather time-consuming and not without danger. The products must be considered as rather dangerous chemical products. Hence for the above mentioned products in the accompanying safety instructions it is specified that all contact with the skin and the eyes must be avoided. Putting a certain dose of such a dangerous chemical product in a burning fire place is rather dangerous.

A solid fuel element exists in which a product is incorporated for disintegrating a combustion deposit layer. This solid fuel element is described in the French patent no. FR-2 749 855, and consists of three different ingredients, namely a solid cellulose-containing fuel such as for example wood waste, a chemical and/or catalytic product for disintegrating tar and/or soot deposits and an added binding agent such as for example paraffin. The binding agent is used in order to make a cohesive aggregate of the mixture of solid fuel particles and the chemical product. This occurs for example by pressing the mixture into a mould.

This element can placed in the installation or the apparatus prior to lighting the fire place. With the combustion of the element the chemical product incorporated therein is gradually released without additional operations still being required. The difficult, dangerous and time-consuming manipulation of the product is because of this indeed avoided, but this element has the great disadvantage that the raw material and production costs for producing it are rather high. Another disadvantage lies in the fact that the production of this element is only possible if the solid fuel is mixed "in small particles" with the chemical product and the binding agent. Large units of a certain fuel, e.g. wooden logs, first have to be reduced to a quantity of small particles before they can be used for the production of these elements. This additional operation increases the production costs even higher.

The purpose of this invention is efficiently and simply to provide a method for manufacturing a solid combustible element with a product for disintegrating a combustion deposit layer that is less expensive than the known methods, and in particular can be produced at low raw material and production costs, even starting with relatively large units of a certain fuel.

In order to achieve this purpose according to this invention a method is provided for manufacturing a solid combustible element comprising a product for disintegrating a combustion deposit layer, whereby an internal space is made in the solid combustible element, and whereby the aforesaid product is provided in this internal space.

In the scope of this invention, and more specifically in this specification and in the accompanying claims, the term "internal space" is used in the sense of any opening, gap, recess, passage, channel or hollow in the material of the combustible element that is at least partly surrounded by this material. This signifies that such an internal space can be both open and closed, and that being or not being fully closed off from such a space therefore cannot be interpreted as a characteristic through which this space could not be considered as an internal space in the meaning that is applied in this patent application. Hence among others a bore or a channel in the element of which the access opening(s) are not closed off is considered as an internal hollow space.

By a combustion deposit layer in this specification and in the claims of this patent application is meant any deposit layer whatever that has originated as a result of a contact with smoke and/or fire, and in particular a deposit layer that contains soot particles and/or ash and/or tar. By a product for disintegrating such a combustion deposit layer is meant any product that can totally or partially disintegrate such a deposit layer (irrespective of the composition thereof) or can reduce the coherence of such a deposit layer or can promote or cause such a disintegration or reduction of coherence to arise.

If for the production of an element according to this invention use is made of small particles of a solid fuel it is no longer necessary to add a binding agent to the combination of solid fuel particles and the product for disintegrating a combustion deposit layer. Very many combustible products can indeed be compressed under great pressure without adding any binding agent until they form a cohesive aggregate. For example in the case of combustible particles of vegetable origin (such as among others wood waste or sawdust) a natural component (lignin) ensures the necessary cohesion between the various particles. Keeping an internal space open in the course of the compression does not entail any additional raw material costs or production costs. After the compression such an internal space can also be formed with very small additional production costs (e.g. by drilling an opening). Finally only the product still has to be provided in this internal space.

For the production of a combustible element according to this invention use can also be made of relatively large units of a solid fuel, without these first having to be reduced to smaller particles. It is indeed sufficient to provide an internal space in these large units, e.g. by drilling, and inserting the aforesaid products therein.

Since no binding agent is necessary there is a saving on the raw material costs. Since the processing of the binding agent and the forming of a mixture of components (according to the known production method from the above mentioned French patent) is omitted and is replaced by the simple insertion of a product in an internal space provided for that purpose, this production method is also much simpler and less expensive. Also starting with relatively large units of a solid fuel, such as e.g. wooden logs or stumps the production method is much less expensive than the existing production method. The natural coherence of the element can then indeed be retained. The result of all of this is that a combustible element according to this invention can be produced at a considerably lower cost price than the known fuel elements.

An additional purpose of this invention is to provide a solid combustible element that comprises a product for disintegrating a combustion deposit layer, and that in comparison to the known products can be produced at lower raw material and production costs (even starting with relatively large units of a certain fuel).

This purpose is achieved, and this appears sufficiently clearly from the above, by according to this invention providing a solid combustible element that is manufactured according to the above described method according to this invention.

In a preferred embodiment the element has a natural coherence or through the compression of an amount of loose particles of one or several combustible materials, without addition of any binding agent, it is compressed to a coherent aggregate, while in the element an internal space is provided in which the aforesaid product is located. Use can therefore be made of the natural properties and components of the combustible material in order to form a cohesive aggregate. In the case of combustible materials of vegetable origin it is the lignin therein that ensure this. No binding agent need therefore be added any longer. For the combustible material all combustible products are suitable, but waste products or residual substances from other production processes are preferred because they are usually rather inexpensive. The aforesaid loose particles can be very small, such as for example in the case of sawdust, but can also be several centimeters long if for example combustible fibers or vegetable parts are used.

It is also possible not to manufacture the element through the compression of loose particles of a combustible material, but to use an element with a natural coherence. A wooden log or wooden stump for example has a natural coherence in contrast to a compressed amount of wood waste or sawdust where the coherence is obtained by technical means (a press), whether or not after adding a binding agent. In such an element with a natural coherence only an internal space then has to be made (for example by drilling an opening in it) and the product subsequently has to be placed in this space. The opening can be closed off again (e.g. by means of a cork or sealing plugs) after inserting the product in order to prevent the product from falling out. This is however not absolutely necessary.

Other measures can also be taken in order to prevent the product from falling out of the internal space again. Thus the product can be provided in a casino or recipient that fits into the internal space whereby the casing or recipient can be wedged in this space (e.g. because of the fact that it is compressible) or can be attached in another manner (e.g. by an adhesive). The product could also be processed into a solid form (whether or not by adding an additional carrier material), whereby this solid form can be attached inside the internal space.

The casing, the recipient, the possible carrier material and the possible sealing plugs are preferable made of products that combust well and with combustion do not cause the formation of substances that can damage health or the environment.

The combustible materials are preferably principally of vegetable origin. These materials are often found as waste materials, among others from agriculture, the food industry and wood processing industry, and are in general rather inexpensive. Furthermore most vegetable materials have the important advantage that they can be compressed into a cohesive aggregate without adding any binding agent. Combustible materials of non-vegetable origin, such as among others fossil fuels (coal), can be used.

The aforesaid product can be provided in the internal space both in powder form or as a liquid or as one or several solid units (e.g. tablets).

The element preferably has an elongated form that is symmetrical in relation to a central axis extending according to the longitudinal direction, while the internal space extends according to the aforesaid central axis.

With the implementation of the method according to this invention the internal space can be closed off after the aforesaid product is placed therein, and either an element can be formed by compressing an amount of loose particles of one or several combustible materials without adding any binding agent until they form a coherent aggregate, or an element with a natural coherence can be used.

If the pressing mould is heated during the compression of the particles the additional advantage is obtained that the coherence of the particles is increased because of the fact that a hard crust is formed on the surface of the sides of the element that come into contact with the heated pressing mould walls. This is particularly so if the compressed particles contain cellulose.

It is also a particular cost saving if during the compression a passage is kept free through the element. This passage can then function as the aforesaid internal space. This saves a processing step and consequently decreases the production costs.

The method according to this invention is preferably so applied that a combustible element is obtained with the above mentioned properties.

For the product for disintegrating a combustion deposit layer any product known for that purpose can be used, and among others all products that are mentioned in the aforesaid French patent.

In that which follows, a possible embodiment and a production method according to this invention are described in detail, with the purpose of clarifying complementing the characteristics of the invention. This specification can therefore in no way be interpreted as a restriction on the scope of protection for this invention defined in the claims. In this specification reference is made to the attached.

FIG. 1, in which a preferred embodiment of a combustible element according to this invention is represented in perspective.

Sawdust from wood (preferably dust free) is fed in a continuous feed stream on a conveyor belt system through a drying installation until the sawdust is dried to a degree of humidity from 2% to 8%.

The dried sawdust is subsequently conveyed to a series of pressing devices. Each pressing device comprises an open pressing channel with an octagonal section. From the open entrance of the channel to the open exit thereof the transverse dimensions gradually decrease. It is obvious that this pressing channel can have any possible form in cross-section, such as e.g. triangular, quadrangular, rectangular, hexagonal or round.

Each pressing device furthermore still also comprises a heating device with which the walls of the pressing channel can be heated to a temperature of 100° C. to 200° C.

Finally each pressing device is provided with a pressing screw that comprises a central shaft to which a wall connects extending in radial direction and running helically around the central shaft (hereinafter called helical wall).

This pressing screw has a rear part connecting to a feed hopper into which the sawdust is fed and a front part that is in the pressing channel.

The front part of the pressing screw has a projecting shank in front in the extension of the central axis. The sawdust falls out of the feed hopper into the spaces between successive helical wall parts of the rear part of the pressing screw and is brought forward by the continuous rotation of this pressing screw—according to the principle of the Archimedean screw—and pressed into the pressing channel. In this manner the pressing screw continuously brings sawdust to the pressing channel, and presses the sawdust in the channel toward the outlet of the channel. Through this pressure and through the gradual narrowing of the pressing channel the sawdust is compressed. In the course of the pressing the walls of the pressing channel are held at a temperature of approximately 180° C.

At the outlet of the pressing channel the sawdust forms a cohesive aggregate. The coherence is obtained on the one hand by the "lignin" present in the wood that is released during the production process, and on the other hand because of the fact that the contact with the heated pressing channel walls forms a hard crust on the surface of the side walls of the compressed aggregate. Through the room that the shank of the pressing screw projecting in front occupies in the pressing channel the aggregate is formed with a central passage that extends according to its longitudinal axis.

As long as the pressing installation operates and is provided with sawdust the length of this aggregate grows. In order to obtain easily manageable blocks the aggregate is sawed by an automatic sawing installation into pieces with a length of ±20 to 30 cm and a weight of approximately 800 g to 1000 g.

Elongated elements (1) are thus obtained with the appearance of a wooden block with an octagonal cross-section, with a central passage (2) that is principally cylindrical, and with a dark brown hard crust on the surface of the side walls (3). On the end faces (4) of each element (1) the granular structure can clearly be seen in which the compressed wood particles can still more or less be distinguished.

After the pressing and the sawing of the elements (1), the elements are allowed to cool. Subsequently a well-determined amount of a powdery chemical product is inserted into the central passage of each element. For an element that weighs approximately 1000 g without the product approximately 150 g of product are provided. Finally the two openings of the passage (2) of each element (1) are sealed by means of corks or plugs of a combustible material, or any other sealing means.

It is obvious that other production methods whereby loose particles of one or several combustible materials are compressed into a coherent aggregate also fall within the scope of this invention. Such another method is for example compression in a closed mould.

Effective products for disintegrating a combustion deposit layer are among others products that contain an ammonium salt and/or phosphoric acid or phosphorus pentoxide. A mixture of an ammonium salt and phosphorus pentoxide are preferred. The aforesaid ammonium salt is for example ammonium sulfate.

What is claimed is:

1. A method for manufacturing a solid combustible element (1) that comprises a product for disintegrating of a combustion deposit layer, comprising the steps of forming an internal space (2) in the solid combustible element (1) and placing said product in said space (2), wherein said product is any of liquid, powder, or solid units.

2. A method according to claim 1 characterized in that the forming step comprises compressing an amount of particles of one or several combustible materials in the absence of a binding agent until the particles form a coherent aggregate.

3. The method according to claim 2 characterized in that heat is applied during the compressing of the particles.

4. A method according to claim 2 characterized in that the internal space (2) is formed by maintaining a passage through the element (1) during the compressing.

5. A method according to claim 2 characterized in that the particles have a natural coherence.

6. Method for manufacturing a solid combustible element (1) according to claim 1 characterized in that the internal space (2) is closed off after the aforsaid product is placed therein.

7. A method according to claim 6 wherein said forming step comprises compressing an amount of loose particles of one or several combustible materials in the absence of a binding agent until the particles form a coherent aggregate.

8. The method according to claim 3 characterized in that the internal space (2) is formed by maintaining a passage through the element (1) during the compressing step.

9. A solid combustible element (1) comprising a product for disintegrating a combustion deposit layer, characterized in that the element (1) is formed by compressing an amount of loose particles of one or several combustible materials which have a natural coherence in the absence of a binding agent to form a coherent aggregate that has an internal space (2) and that the aforesaid product is located in said space (2), wherein the product is any of liquid, powder, or solid units.

10. A solid combustible element (1) according to claim 9 characterized in that the internal space (2) it is closed off after inserting the product.

11. A solid combustible element according to claim 9 characterized in that the combustible materials are of vegetable origin.

12. A solid combustible element (1) according to claim 9 characterized in that the aforesaid product is solid units.

13. A solid combustible clement (1) according to claim 9 characterized in that said element (1) has an elongated form that is symmetrical in relation to a central longitudinal axis extending through said element and that the internal space (2) extends along the aforesaid central longitudinal axis.

* * * * *